United States Patent [19]
Bai et al.

[11] Patent Number: 5,545,493
[45] Date of Patent: Aug. 13, 1996

[54] VACUUM BATTERY INDICATOR

[75] Inventors: Monty W. Bai, Scottsdale; Thomas M. Kerns, Tempe; Edward L. Brannon, Mesa, all of Ariz.

[73] Assignee: Motorola, Inc., Schaumburg, Ill.

[21] Appl. No.: 552,406

[22] Filed: Nov. 3, 1995

[51] Int. Cl.⁶ .......................... H01M 10/48; H01M 6/38
[52] U.S. Cl. ............................................. 429/90; 429/116
[58] Field of Search ........................ 429/90, 110, 116, 429/114, 115

[56] References Cited

U.S. PATENT DOCUMENTS 4,699,854  10/1987  Snyder ........................ 429/114
4,861,686   8/1989  Snyder ......................... 429/90

Primary Examiner—Anthony Skapars
Attorney, Agent, or Firm—Frank J. Bogacz

[57] ABSTRACT

Enclosure (28) of vacuum battery (10) includes a vacuum spring indicator (21). In a first position (23) of vacuum spring indicator (21) an indication is made that a sufficient vacuum has been drawn within enclosure (28). By a second position (24) of vacuum spring indicator (21), and indication is made that no vacuum exists within enclosure (28) and battery (10) is not operational.

15 Claims, 2 Drawing Sheets

VACUUM BATTERY INDICATOR

BACKGROUND OF THE INVENTION

The present invention pertains to vacuum batteries and more particularly to indicators for depicting the status of the vacuum battery.

Deferred action batteries are well known in the art and are used when it is necessary to have a battery with a long shelf life or when activation of the cell is desired only immediately prior to use. Such batteries are able to have a long shelf life by maintaining the battery cells in sealed condition without electrolyte. The electrolyte may be added just prior to use of the battery.

Deferred action batteries are used in artillery shells and similar devices which depend battery power for operation but require safety and reliability when not in use.

The proper deployment of artillery shells depends on a quickly deployable and known (good) battery. Fuzing arrangements are typically checked and enabled just prior to deployment of the artillery shells. Without a proper functioning battery, artillery shells may not be operational at all or may operate at an inappropriate time. Battery vacuum may be checked with a meter, but this is expensive to incorporate into each battery and is highly intensive of an operator's time when such time is critical just prior to the deployment of the artillery shells.

U.S. Pat. No. 4,699,854 issued on Oct. 13, 1987 and entitled "Multi-Option Deferred Action Battery" and U.S. Pat. No. 4,861,686 issued on Aug. 29, 1989 and entitled "Multi-Cell, Vacuum Activated Deferred Action Battery" show typical state-of-the-art vacuum batteries for us in fuzes of artillery shells.

What is required is a low cost and easily detectable indicator for showing the status of a vacuum battery.

DESCRIPTION OF THE PREFERRED EMBODIMENT

Figure 1:
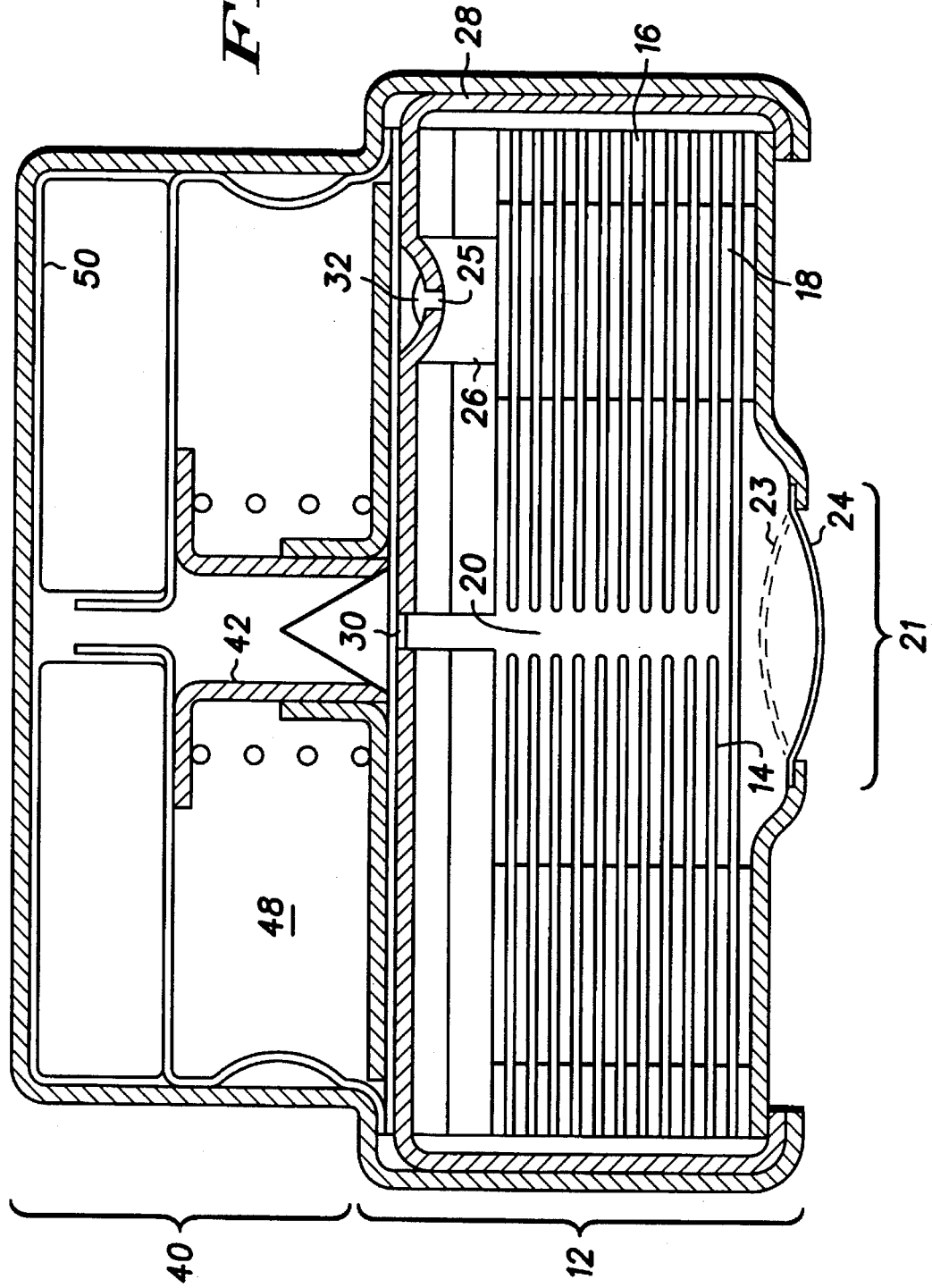
FIG. 1 is a side view of a vacuum battery with a vacuum battery indicator in accordance with the present invention.

FIG. 1 is a cross-sectional view of a side of a reserve multi-celled vacuum activated battery, 10. Battery 10 includes a cell assembly 12 and an ampule assembly 40.

Within battery assembly 12 a number of cells are coupled in series by stacked annular bipolar plates 14 electrically isolated from one another and physically connected at the outer edges to form cells. In between separators 16 a fill hole 20 located in the center of each plate forms a passage which interconnects each of the battery cells.

A bibulous material 18 fills the cells and is located between plates 14. The bibulous material 18 does not obstruct fill hole 20. Bibulous material 18 is a bibulous paper with an opening in the center corresponding to fill hole 20. The stacked battery cells 14 are then enclosed in a hermetically sealed container 28. Hermetic container 28 includes a bottom area 21. The bottom area may comprise an area made of spring steel, copper beryllium or stainless steel having a spring action. This bottom area may be called a vacuum indicator or a vacuum spring indicator. The vacuum indicator is a circular area in its preferred embodiment, but can be any number of other shapes, such as, square, rectangular or triangular. Without any forces exerted on bottom area 21 of hermetic container 28, vacuum spring indicator 21 resides in its non-vacuum position 24.

As a vacuum is drawn through vacuum hole 26 via aperture 25, vacuum spring indicator 21 deflects to a known good position 23, a detent. When a sufficient vacuum is drawn within enclosure 28, spring action area 21 has deflected to its position 23. The inspection to determine that a proper vacuum has been achieved may be performed visually or by touch of an operator. Then aperture 25 of vacuum hole 26 may then be sealed by solder 32 or other suitable sealants.

Ampule assembly 40 has a diaphragm 30 coupling it to container 28. Electrolyte (battery fluid) 48 is contained within ampule enclosure 50 of ampule assembly 40. Ampule assembly 40 includes a cutter 42. When a force is applied, cutter 42 will cut ampule enclosure 50 and puncturable diaphragm 30. The vacuum in container 28 will cause the electrolyte 48 to be drawn into container 28 from ampule enclosure 50. The electrolyte fills bibulous paper 18 and is spread uniformly throughout the cells by the action of bibulous paper 18. Thereby, an active battery will be formed by electrolyte 48 and battery cells 14. This battery, for example, may be connected to a fuze assembly (not shown) through lead wires (not shown).

When the battery is formed by the action of cutter 42 against diaphragm 30, vacuum within container 28 is lost and vacuum indicator 21 deflects to the non-vacuum indicator position 24, a bubble formation. Position 24 indicates that the battery 10 has previously been used and is no longer in a known good state or that a vacuum leak has developed in enclosure 28 and the battery 10 will not function. In either case above the battery 10 is now in a known bad state.

As can be seen from the above, vacuum indicator 21 performs two functions. First, during the manufacture of the battery 10 when vacuum indicator 21 deflects from its non-vacuum position 24 to its known good vacuum indication position, vacuum indicator 21 indicates that a sufficient vacuum has been drawn within container 28 and container 28 may be sealed for subsequent use. Second, vacuum indicator 21 indicates that the vacuum within enclosure 28 is lost and thereby battery 10 will not function, if vacuum indicator 21 is displaced to position 24. The displacement of vacuum indicator 21 to position 24 occurs, if cutter 42 pierces diaphragm 30 upon the exertion of sufficient force upon battery 10 or if enclosure 28 loses its vacuum seal for any reason.

Figure 2:
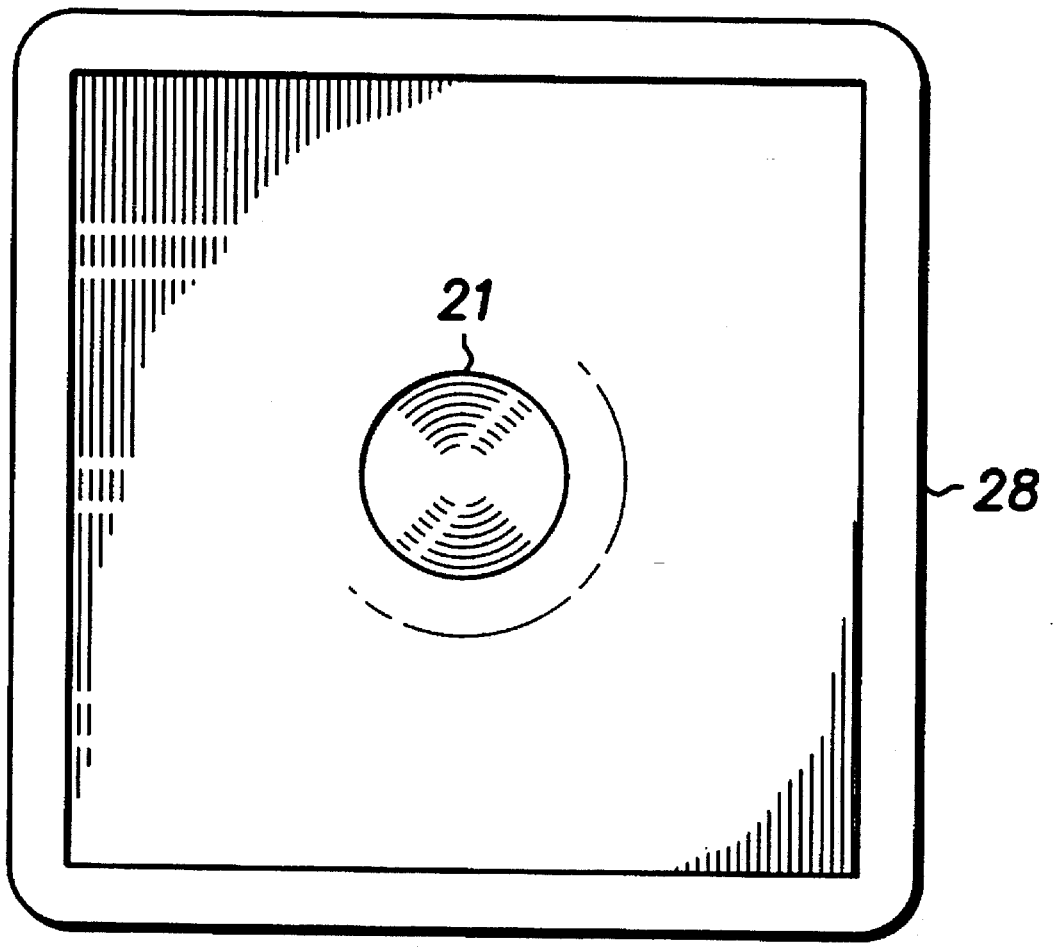
FIG. 2 is a bottom view of the vacuum battery in accordance with the present invention.

FIG. 2 depicts a bottom view of container 28 showing vacuum indicator area 21. Although vacuum indicator 21 is shown on the bottom of enclosure 28, vacuum indicator 21 may be located on any external surface of enclosure 28, that is, sides, top or bottom.

The enclosure 28 may be made of a steel material, for example. Cells 14 may be lead oxide ($PBO_2$).

It can be seen from the above that vacuum indicator 21 provides the following advantages for battery 10. First, spring indicator 21 indicates, when it is in vacuum position 23, that the sufficient vacuum has been drawn and maintained within enclosure 28. Thereby a low cost arrangement for measuring sufficient vacuum within container 28 is provided. No need for expensive meters exists. Second, vacuum indicator 21 indicates, when it is in position 24, that the vacuum within enclosure 28 has been released. Therefore, it would be easy for one to determine by the sense of touch or by visual examination whether battery 10 is in a known good condition before the battery is put into a fuzing arrangement, for example.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a vacuum battery including a battery cell assembly having a plurality of battery cells and a fill hole therethrough, a bibulous material filling said plurality of said battery cells, and a hermetically sealable enclosure having a puncturable diaphragm on a surface of said hermetically sealable enclosure; an ampule assembly coupled to said surface of said hermetically sealable enclosure and coupled to said puncturable diaphragm, said ampule assembly including an ampule enclosing an electrolyte, and a cutter for puncturing said puncturable diaphragm and allowing said electrolyte to enter said battery cell assembly; the improvement comprising:

a vacuum indicator forming an area of an external surface of said hermetically sealable enclosure, said vacuum indicator deflecting to a first position when a sufficient vacuum is drawn within said hermetically sealable enclosure.

2. A vacuum battery as claimed in claim 1, wherein said vacuum indicator comprises a spring steel vacuum indicator.

3. A vacuum battery as claimed in claim 1, wherein said vacuum indicator comprises a stainless spring steel vacuum indicator.

4. A vacuum battery as claimed in claim 1, wherein said vacuum indicator comprises a copper beryllium spring vacuum indicator.

5. A vacuum battery as claimed in claim 1, wherein said vacuum indicator forms an area on a bottom surface of said hermetically sealable enclosure and is detectable as a detent by visual inspection or touch inspection of said first position of said area.

6. In a vacuum battery including a battery cell assembly having a plurality of battery cells and a fill hole therethrough, a bibulous material filling said plurality of said battery cells, and a hermetically sealed enclosure having a puncturable diaphragm on a surface of said hermetically sealed enclosure; an ampule assembly coupled to said surface of said hermetically sealed enclosure and coupled to said puncturable diaphragm, said ampule assembly including an ampule enclosing an electrolyte, and a cutter for puncturing said puncturable diaphragm and allowing said electrolyte to enter said battery cell assembly; the improvement comprising:

a vacuum indicator forming an area of an external surface of said hermetically sealed enclosure, said vacuum indicator deflecting to a second position when a vacuum is released from said hermetically sealed enclosure.

7. A vacuum battery as claimed in claim 6, wherein said vacuum indicator comprises a spring steel vacuum indicator.

8. A vacuum battery as claimed in claim 6, wherein said vacuum indicator comprises a stainless spring steel vacuum indicator.

9. A vacuum battery as claimed in claim 6, wherein said vacuum indicator comprises a copper beryllium spring vacuum indicator.

10. A vacuum battery as claimed in claim 6, wherein said vacuum indicator forms an area on a bottom surface of said hermetically sealed enclosure and is detectable as a bubble formation by visual inspection or touch inspection of said first position of said area.

11. In a vacuum battery including a battery cell assembly having a plurality of battery cells and a fill hole therethrough, a bibulous material filling said plurality of said battery cells, and a hermetically sealed enclosure having a puncturable diaphragm on a surface of said hermetically sealed enclosure; an ampule assembly coupled to said surface of said hermetically sealed enclosure and having said puncturable diaphragm, said ampule assembly including an ampule enclosing an electrolyte, and a cutter for puncturing said puncturable diaphragm and allowing said electrolyte to enter said battery cell assembly; the improvement comprising:

a vacuum indicator forming an area of an external surface of said hermetically sealed enclosure, said vacuum indicator deflecting to a first position when a sufficient vacuum is drawn within said hermetically sealed enclosure; and said vacuum indicator deflecting to a second position when said vacuum is released from said hermetically sealed enclosure.

12. A vacuum battery as claimed in claim 11, wherein said vacuum indicator comprises a spring steel vacuum indicator.

13. A vacuum battery as claimed in claim 11, wherein said vacuum indicator comprises a stainless spring steel vacuum indicator.

14. A vacuum battery as claimed in claim 11, wherein said vacuum indicator comprises a copper beryllium spring vacuum indicator.

15. A vacuum battery as claimed in claim 11, wherein said vacuum indicator forms an area on a bottom surface of said hermetically sealed enclosure and is detectable as a detent of said first position of said area or is detectable as a bubble formation of said second position of said area by visual inspection or touch inspection.

* * * * *